United States Patent [19]
Krude

[11] 4,311,027
[45] Jan. 19, 1982

[54] TELESCOPIC DRIVE SHAFT

[75] Inventor: Werner Krude, Neunkirchen, Fed. Rep. of Germany

[73] Assignee: Uni-Cardan Aktiengesellschaft, Seigburg, Fed. Rep. of Germany

[21] Appl. No.: 79,370

[22] Filed: Sep. 27, 1979

[30] Foreign Application Priority Data

Oct. 9, 1978 [DE] Fed. Rep. of Germany ....... 2843935

[51] Int. Cl.³ .............................................. F16D 3/06
[52] U.S. Cl. .................................................... 64/23.7
[58] Field of Search ...................... 64/23, 23.7, 23.5, 8; 403/109

[56] References Cited

U.S. PATENT DOCUMENTS

| | | | |
|---|---|---|---|
| 1,508,653 | 9/1924 | Flick | 64/23 |
| 2,800,004 | 7/1957 | Schroter | 64/23 |
| 2,992,548 | 7/1961 | Walterscheid-Muller | 64/23 |
| 3,001,387 | 9/1961 | Schultz | 64/23 |
| 3,663,046 | 5/1972 | Reiner et al. | 64/23 |
| 3,797,276 | 3/1974 | Orain | 64/23.7 |
| 4,156,354 | 5/1979 | Krude | 64/23.7 |

FOREIGN PATENT DOCUMENTS 1219291 7/1961 Fed. Rep. of Germany .......... 64/23
1373752 4/1963 France .................................... 64/23

Primary Examiner—Ira S. Lazarus
Assistant Examiner—Magdalen Moy
Attorney, Agent, or Firm—Toren, McGeady & Stanger

[57] ABSTRACT

A telescopic drive shaft is formed of a tubular outer shaft member and an inner shaft member axially displaceable within the outer shaft member. At least one cross bore extends through the inner shaft member at right angles to the axis of the outer shaft member. Grooves are formed in the inner surface of and extend in the axial direction of the outer shaft member. Roll bodies, such as balls or rollers with cylindrical rolling surfaces, are positioned within the cross bores with adjacent roll bodies in surface contact with one another and with the surface of the cross bore. Each cross bore has a roll body extending outwardly into rolling contact with the surface of the groove in the outer shaft member.

5 Claims, 18 Drawing Figures

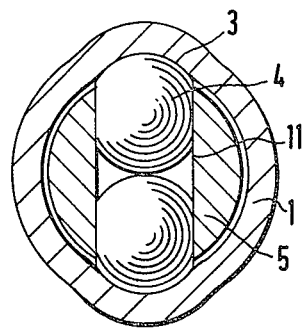 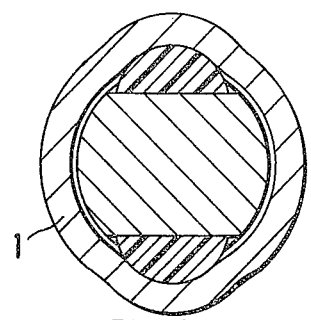 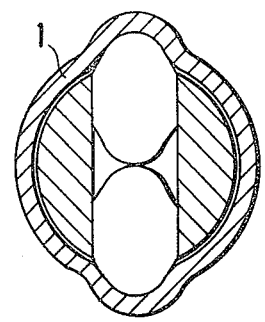
FIG.5    FIG.6    FIG.8
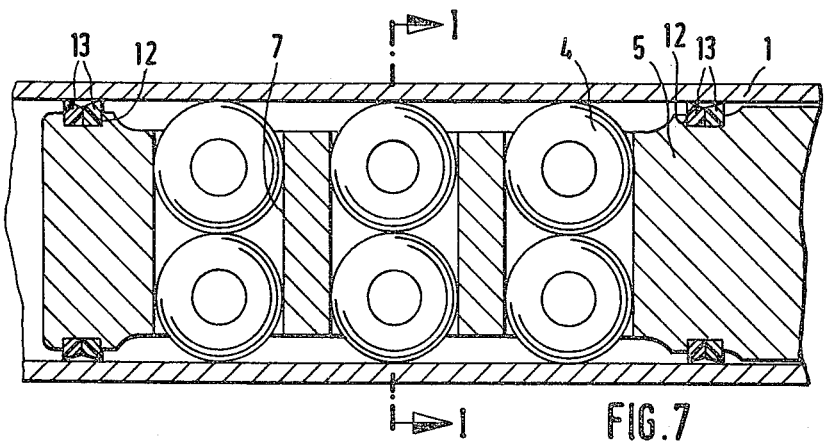
FIG.7
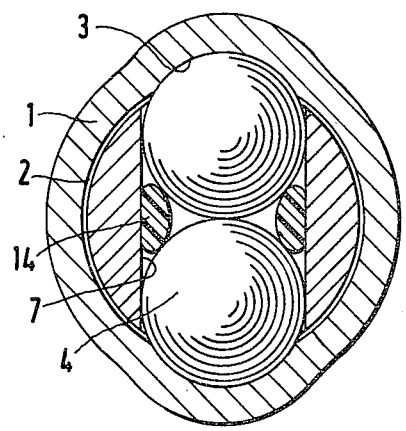 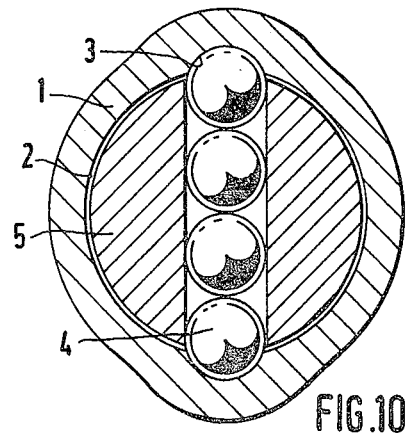
FIG.9    FIG.10

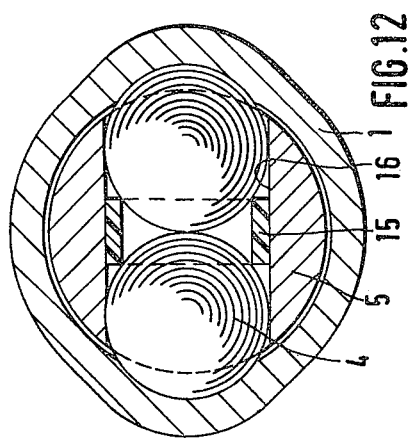
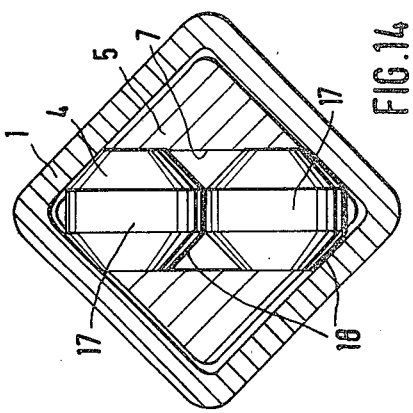
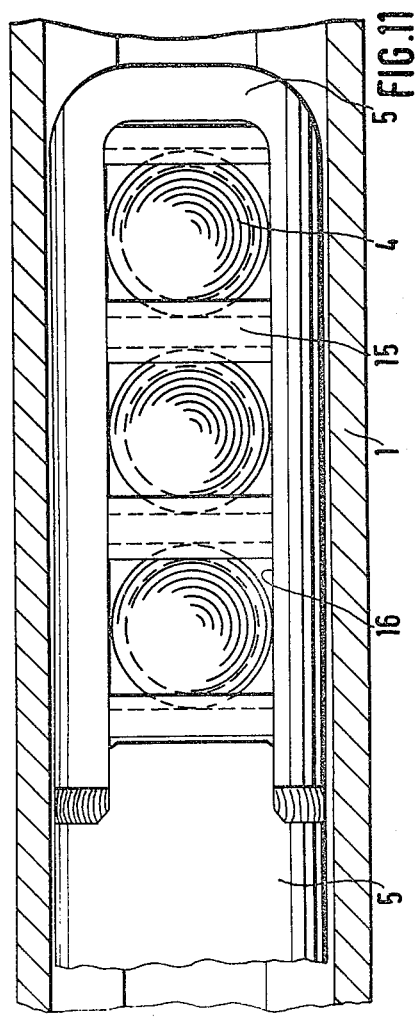
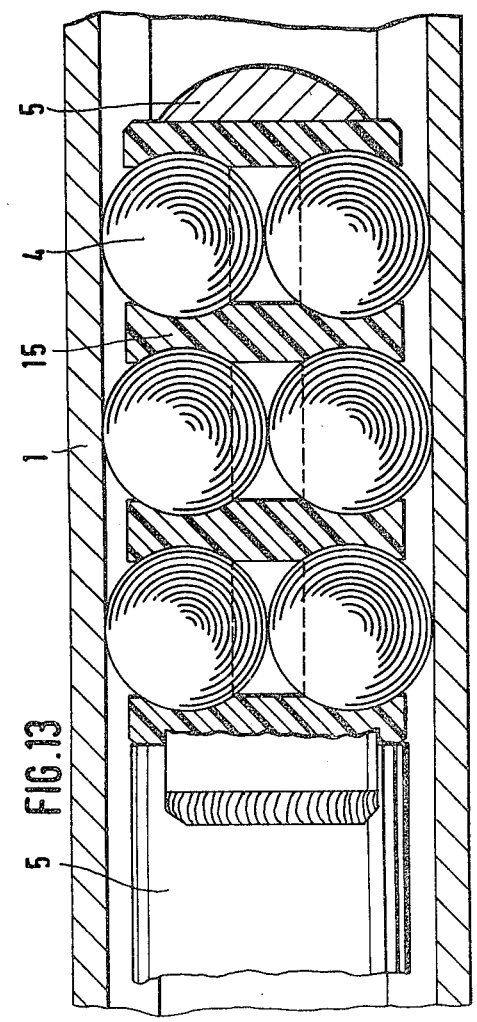

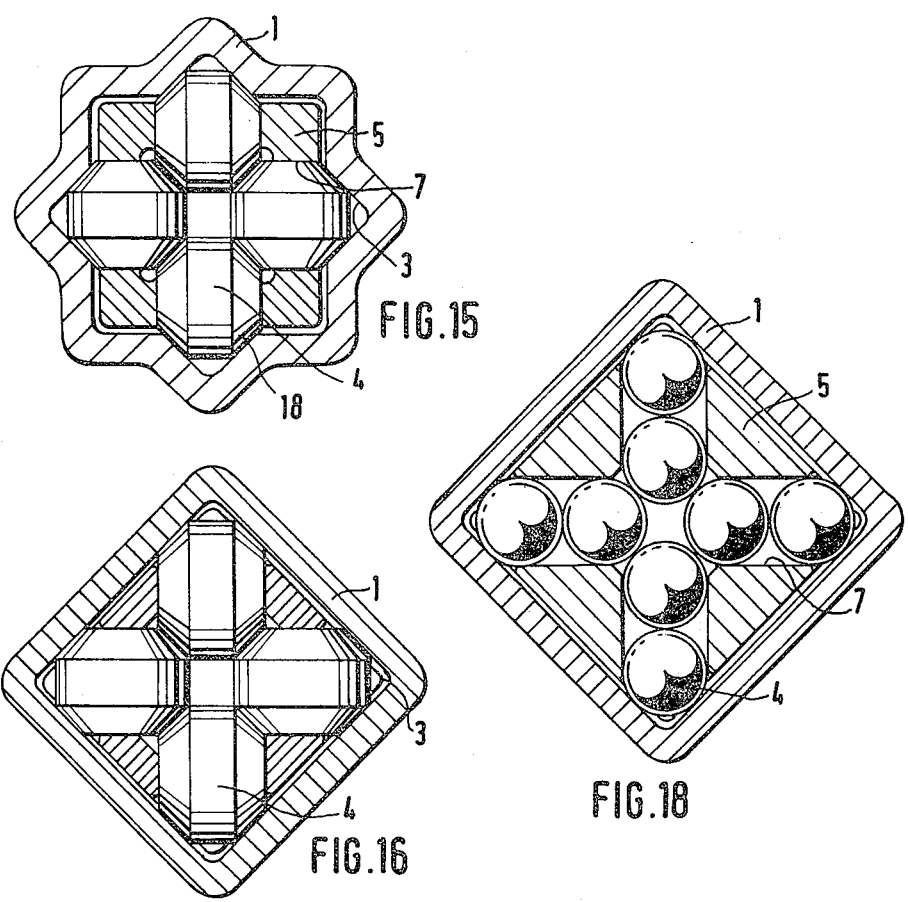
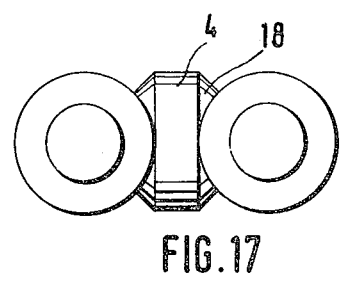

TELESCOPIC DRIVE SHAFT

SUMMARY OF THE INVENTION

The present invention is directed to a telescopic drive shaft having an inner shaft member axially displaceable within a hollow or tubular-shaped outer shaft member. Roll bodies located in cross bores in the inner shaft member serve as torque transmission elements between the two shaft members. The cross bores extend at right angles to the axis of rotation of the drive shaft. The roll bodies extend from the cross bores into grooves formed in the inner surface of the outer shaft member.

In German Patentschrift No. 1 019 515 a telescopic shaft is disclosed where the two shaft parts or members are connected through cams located in cross bores and biased into interlocking engagement by springs. The magnitude of the torque transmitted in the shaft can be determined by the initial stress of the cams and the number of cams used. As soon as the maximum torque is exceeded, the cams are pressed inwardly and protect the drive or cardan shaft from overload. With the cams pressed inwardly or disengaged there is no transmission of torque between the two shaft parts.

Another telescopic shaft is known from German Patentschrift No. 1 219 291 where at high torques and torque peaks due to locking, the danger of rupture of the telescoping shaft sections is diminished by filling oil into an annular cavity, however, this guide arrangement is very expensive and its integrity is assured only by the use of an additional seal. If the telescopic shaft system leaks, there is the problem of loss of oil and the possible penetration of dirt into the shaft with the result that a satisfactory guide is no longer ensured. Moreover, when such leakage occurs, there is the danger of rupture of the telescopic shaft during use.

Therefore, it is the primary object of the present invention to minimize the axial forces occurring during operation of a telescopic shaft by utilizing simple means while maintaining a constant engagement of the torque transmission elements.

In accordance with the present invention, the torque transmission elements are formed as roll bodies with at least two roll bodies located within each cross bore in the inner shaft member with the roll bodies in surface contact with one another.

In this arrangement of a telescopic drive shaft, it is advantageous if the radial forces produced in the transmission of torque are intercepted and neutralized at the location of contact between two adjacent roll bodies. When the inner shaft member is displaced in the axial direction, the roll bodies roll, on one hand, in the grooves formed in the inner surface of the outer shaft member and, on the other hand, they roll in contact with one another. In such an arrangement, even at peaks in torque transmission, locking of the telescoping shaft members is avoided. Rolling of the roll bodies also occurs under the action of increased friction developed at torque peaks. In this arrangement, the rolling of the roll bodies occurs without any additional auxiliary means.

When partly spherical roll bodies are used, the cross bore has a diametrical dimension in one direction equal to the diameter of the spherical surfaces. Because of the low tolerances involved and the absence of play between the roll bodies and the cross bore, the rolling of the roll bodies is assured and no additional means are needed.

If only two longitudinally or axially extending grooves are provided in the outer shaft member offset from one another by 180° and a large torque cavity of the telescoping shaft is desired, another essential feature of the arrangement is the provision of a number of cross bores with the axes of the bores disposed in parallel relation.

In still another arrangement, where a plurality of cross bores are used, at least one of them can be disposed at an angle to the others. An advantage achieved in angularly off-setting at least one cross bore to the others, is the attainment of an exact guidance of the inner shaft member within the outer shaft member. Additional guide members for centering the inner shaft member become superfluous.

To utilize the tubular cross section of the outer shaft member in its original shape without forming longitudinal grooves, at least a pair of cross bores are provided in a common plane with the axes of the bores extending angularly relative to one another and disposed at right angles to the axis of the telescopic shaft.

To maintain the outside diameter of the outer shaft member small while absorbing the same torque capacity, another feature of the invention is that the roll bodies are in the form of rollers or balls or spheres. If for manufacturing reasons the outer shaft member is used having only two longitudinally or axially extending grooves offset by 180° to one another, then plastic guide elements are provided in recesses formed in the inner shaft member and extend into the longitudinal grooves for guiding the inner shaft member in the outer shaft member. These guide elements do not influence axial forces, since they do not transmit forces and, accordingly, no friction is developed between the inner and outer shaft members because of them.

In another simplified arrangement for reducing production costs, in a single cross bore a number of roll bodies are provided in surface contact with one another and intermediate elements formed of a plastic material are located between the roll bodies.

In another embodiment elastic spacer rings are provided within the inner shaft member for forming the cross bores in which roll bodies are positioned in surface contact with one another.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 5 is a transverse sectional view taken along line A—B in FIG. 4;

FIG. 6 is a transverse sectional view taken along line C—D in FIG. 4;

FIG. 7 is a sectional view similar to that in FIGS. 1 and 4 of still another embodiment of a telescopic drive shaft incorporating the present invention;

FIG. 8 is a transverse sectional view taken along the line I—I in FIG. 7;

FIG. 9 is a transverse sectional view similar to that in FIGS. 5 and 8, however, including a spacer ring between adjacent roll bodies;

FIG. 10 is a transverse cross sectional view, similar to that in FIG. 5, with four roll bodies in the cross bore;

FIGS. 11, 12 and 13 illustrate an embodiment of the present invention with all of the roll bodies located within an axially extending recess in the inner shaft member, with FIGS. 11 and 13 illustrating axially extending sectional views and FIG. 12 providing a transverse sectional view;

FIG. 14 is a telescopic drive shaft in which the outer shaft member is in the form of a square tube;

FIG. 15 illustrates still another telescopic drive shaft in which the outer shaft member is in the form of a multi-sided tube;

FIG. 16 exhibits a telescopic drive shaft with the outer shaft member in the form of a rectangular tube;

FIG. 17 is a view of the roll bodies shown in FIGS. 15 and 16 viewed in a plane rotated 90° to the viewing plane of these two figures; and FIG. 18 is another telescopic drive shaft similar to that shown in FIG. 16 with four balls positioned in each cross bore for effecting torque transmission as distinguished from the two roll bodies in each cross bore shown in FIG. 16.

DETAIL DESCRIPTION OF THE INVENTION

Figure 1:
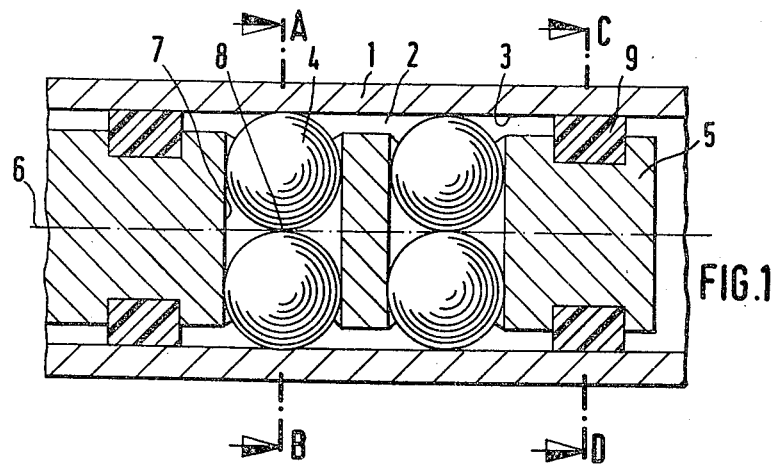
FIG. 1 is a partial axially extending sectional view of a telescopic drive shaft embodying the present invention.
Figures 2, 3:
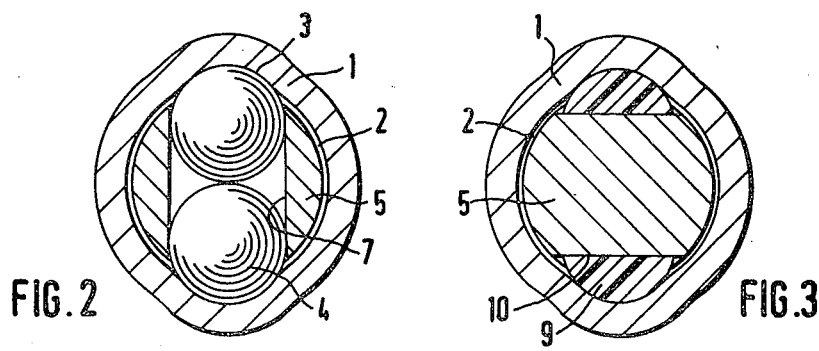
FIG. 2 is a transverse sectional view taken along the line A—B in FIG. 1.
FIG. 3 is a transverse sectional view taken along the line C—D in FIG. 1.

In FIGS. 1, 2 and 3 a telescopic drive shaft is illustrated consisting of a tubular outer shaft member 1 forming a cylindrically shaped passageway 2 in which a pair of diametrically opposed grooves 3 are formed for receiving torque transmission elements or roll bodies 4. As viewed in FIGS. 2 and 3, due to the formation of the grooves 3, the transverse cross section of the outer shaft member 1 has an oblong appearance. Inner shaft member 5 is axially displaceably positioned in the cylindrical passageway 2 of the outer shaft member 1. Two cross bores 7 extend through the inner shaft member 5 at right angles to the longitudinal or rotational axis 6 of the drive shaft. Each cross bore 7 of the inner shaft member 5 contains two torque transmission elements 4 which are in the shape of spheres or balls. Each ball 4 extends from one end of the cross bore 7 into the corresponding groove 3 in the outer shaft member 1. In addition to being in contact with the surface of the groove, note FIG. 2, the two balls are in contact with one another at point 8. The diameter of the balls 4, as can be seen in FIG. 2, corresponds to the cross sectional shape of the grooves 3 so that the balls roll on the surface within the groove. In addition, the balls roll in contact with one another at point 8 located along the axis 6 of the telescopic drive shaft. Accordingly, it is assured that torque is transmitted from the outer shaft member 1 through the ball-shaped roll bodies 4 to the inner shaft member 5 and during axial displacement of the inner shaft member relative axial forces are kept small by the mutual support of the roll bodies. During axial displacement, the roll bodies 4 are in rolling contact with one another at the support point 8.

Guidance for the inner shaft member 5, relative to the outer shaft member 1, is provided by plastics material elements 9 which extend into and slide along the surfaces of the grooves 3. Recesses are formed in the outer surfaces of the inner shaft member 5 providing a flattened surface 10 on which the guidance elements 9 are supported. The elements 9 are held in the inner shaft member 5 without any play relative to the outer shaft member 1. These elements 9 are provided in the inner shaft member 5 on the opposite sides of the cross bores 7 extending transversely through the inner shaft member.

Figure 4:
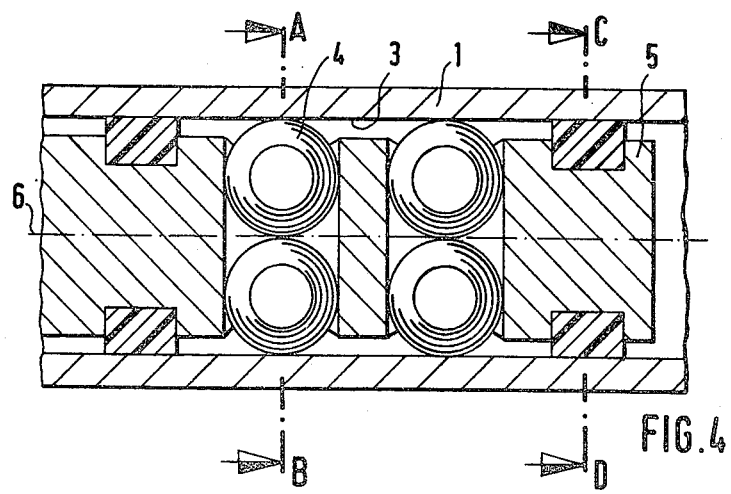
FIG. 4 is a view, similar to FIG. 1, of another embodiment of a telescopic drive shaft incorporating the present invention.

In FIGS. 4, 5 and 6 another embodiment of the telescopic drive shaft is illustrated which corresponds in principle to the arrangement shown in FIG. 1, except the torque transmission elements 4 are not completely spherical but instead have oppositely disposed flat surfaces in contact with corresponding surfaces formed in the cross bores 7 extending through the inner shaft member 5. These rollers 4 are oriented so that the spherically shaped band extending around the circumference of each roller extends into one of the grooves 3 formed in the outer shaft member 1. The radius of this spherically shaped band surface is selected so that the two rollers are in point contact with one another on the longitudinal axis 6 of the telescopic drive shaft. The oppositely disposed flattened surfaces or faces 11 on the rollers 4 are supported in rolling contact with the corresponding sides of the cross bores 4. Accordingly, a larger bearing surface is obtained which reduces the squeezing action within the inner shaft member 5 displacing the torque transmission elements 4 away from the position of point contact.

The embodiment illustrated in FIG. 7 is comparable to that shown in FIG. 4, the only difference being the provision of additional cross bores 7 which ensure an increase in the torque capacity. In addition, in the outer surface of the inner shaft member 5 on the opposite sides located outwardly from the cross bores 7, an annular notch 12 is provided in which one or two lip seals 13 are seated so that they contact the inner surface of the outer shaft member preventing any passage of dirt or dust into the interior of the telescopic drive shaft.

In FIG. 9 ball-shaped torque transfer elements 4 are located in the cross bore 7 in point contact with one another. A plastic element 14 extends around the surface of the cross bore intermediate the ends thereof and projects into the space between the two contacting balls 4. In addition to contacting the surface of the cross bore, the plastic element 14 contacts the surfaces of both of the balls 4 and serves to reduce noise generated during operation of the telescopic drive shaft.

Another transverse sectional view is shown in FIG. 10 which is similar to the general arrangement shown in FIG. 9, except four ball-shaped torque transmitting elements 4 are located in the cross bore through the inner shaft member 5 so that the two outer balls project from the cross bore into the grooves 3 formed in the inside surface of the outer shaft member 1. The surface of the groove 3 is shaped to conform to the spherical surface of the torque transmitting elements 4. The roll bodies or torque transmitting elements are in point contact with one another so that the torque transmitting elements support one another and reduce friction as well as ensuring torque transmission between the inner and outer shaft members. Each torque transmitting element 4 is in rolling contact with at least one other element within the cross bore and is also in surface contact with the cross bore. As mentioned above, the two outer torque transmission elements 4 are in rolling contact with the diametrically opposed grooves 3.

FIGS. 11 and 13 each show a longitudinal section through a drive shaft, while FIG. 12 shows a transverse section through the shaft. In this telescopic drive shaft the torque transmitting elements 4 are located in a single slot-like recess formed by the inner shaft member 5 with the recess extending in the axial direction of the drive shaft. The inner shaft member 5 is a U-shaped yoke forming the axially extending recess 16. The cross bores are formed by plastic blocks 15 spaced apart in the axial direction of the drive shaft, note FIGS. 11 and 13, so that two spherically shaped torque transmitting elements 4 are provided between each pair of blocks 15. The material forming the blocks, such as a plastics material, prevents noise generation caused by rattling during drive shaft operation. As can be seen in FIG. 12, each of the roll bodies 4 extends outwardly from the cross bores formed by the blocks 15 into the grooves 3 formed in the inner surface of the outer shaft member 1. The two roll bodes 4 in each row support one another in point contact at spaced locations along the axis of rotation of the drive shaft.

An alternative arrangement of the drive shaft is displayed in FIG. 14 where the outer shaft member 1 is in the form of a square tube and the inner shaft portion 5, axially slidable within the outer shaft member, also has a square cross section. A cross bore 7 extends diagonally across the square cross section of the inner shaft member 5 and the torque transmitting elements or roll bodies 4 in this cross bore contact one another on cylindrical ring faces 17. Each roll body has a cylindrical ring face 17 with a frusto-conically shaped surface 18 extending from each of its opposite sides. As can be seen in FIG. 14, the angle of the frusto-conical surfaces 18 conforms to the angle formed by the inside surface of the outer shaft member 1 with the cylindrical ring face 17. Accordingly, the edges of the cylindrical ring face 17 and the frusto-conical surfaces 18 provide rolling contact with the inner surface of the outer shaft member and transmit torque from the inner shaft member to the outer shaft member. The cross bore 7 is dimensioned to conform to the comparable dimensions of the roll bodies 4. The inside corners of the outer shaft member 1 form the longitudinally extending grooves into which the roll bodies 4 extend.

In FIG. 15, the outer shaft member 1 of the telescopic drive shaft has a sixteen-sided cross section giving the appearance of a star with eight points. The inner shaft member 5 is four-sided conforming in part to the inner surface of the outer shaft member. Cross bores 7 extend at right angles to one another through the inner shaft member and intersect the sides of the inner shaft member centered between the corners. Each cross bore contains two torque transmitting elements having a shape similar to that of the torque transmitting elements 4 shown in FIG. 14. Each torque transmitting element 4 consists of a cylindrical face surface 17 and a pair of frusto-conical surfaces 18 with the frusto-conical surfaces bearing against the outwardly projecting portions of the outer shaft member 1. When considering the outer shaft member 1 as having the shape of an eight-pointed star, the torque transmitting elements extend into grooves 3 formed by every other point of the star. Radially inwardly within the inner shaft member 5, the frusto-conical surfaces 18 of each torque transmitting element 4 bear against the corresponding surfaces of two other adjacent torque transmitting elements. Grooves 3 located in the outer shaft member 1 are formed by virtue of the special cross sectional configuration of the outer shaft member with the result being that special formation of the grooves is unnecessary. Force is transmitted between the shaft members by the action of the frusto-conical surfaces 18 of the torque transmitting element 4 acting on the corresponding surfaces within the grooves 3 of the outer shaft member. The force acting in the circumferential direction is divided into two components due to the angular arrangement of the frusto-conical surfaces 18 and these components act at right angles to the frusto-conical surfaces 18 and afford a favorable efficiency.

In FIG. 16, as distinguished from the cross sectional shape of the outer shaft member 1 in FIG. 15, the outer shaft member is in the form of a square tube and the cross section of the inner shaft member is also square. The interior corners of the outer tubular member 1 form grooves 3 into which the torque transmitting elements 4 extend. The radially inner frusto-conical surfaces of the torque transmitting elements contact adjacent elements about the axis of the drive shaft. In FIG. 17 the torque transmitting elements 4, as compared to FIGS. 15 and 16, are rotated through 90° and illustrated separate from the outer shaft portion 1. The torque transmitting elements 4 act as rollers with the frusto-conical surfaces 18 disposed in contact with one another so that the rollers roll on one another.

In FIG. 18 another embodiment of the telescopic drive shaft is exhibited with the outer shaft member 1 being formed as a square tube and with the inner shaft member 5 also having a square cross section with the cross bores extending diagonally between the opposite corners of the inner shaft member. Four balls or torque transmitting elements 4 are positioned in each of the cross bores with the centers of the balls being in alignment. The radially inner balls in each cross bore are not in contact with one another, rather the four inner balls contact one another at positions spaced radially outwardly from the axis of the drive shaft. Each row of the torque transmitting elements 4 within the cross bores 7 are arranged so that two balls are positioned in each of the arms of the cruciform-shaped cross bores. The outer ball of each pair extends into the groove formed by the juxtaposed inside corner of the outer shaft member. Each inner ball is in point contact with the inside balls of the two adjacent arms of the cruciform cross bore arrangement. This arrangement resembles the roller-shaped torque transmitting elements 4 in FIGS. 15 and 16 where the radially inner parts of the cylindrical surfaces of the rollers define an open four-sided space at the center of the inner shaft member.

While specific embodiments of the invention have been shown and described in detail to illustrate the application of the inventive principles, it will be understood that the invention may be embodied otherwise without departing from such principles.

What is claimed is:

1. Telescopic drive shaft comprising an axially elongated tubular outer shaft member, an inner shaft member located within said outer shaft member and being displaceable therein in the axial direction of said outer shaft member, said outer shaft member and inner shaft member being rotatable about the axis of said outer shaft member, said inner shaft member having axially extending bores extending perpendicularly of the axis of said outer shaft member, the inner surface of said outer shaft member having grooves therein extending in the axial direction of said outer shaft member, torque transmitting elements positioned within said cross bores and at least certain of said torque transmitting elements extending radially outwardly from said cross bores into engagement within said grooves for effecting torque transmission between said outer and inner shaft members, wherein the improvement comprises that said bores in said inner shaft member extend diametrically therethrough and open from opposite sides of said inner shaft member, the axes of said bores in said inner shaft member are disposed in parallel relation and are spaced apart in the axial direction of said inner shaft member, said torque transmitting elements are roll bodies with at least two said roll bodies positioned in each said cross bore with the surfaces thereof disposed in rolling contact at points located on the axis of said cross bores containing said at least two roll bodies, each said roll body being shaped transversely of the axial direction of said cross bore so that said roll body contacts the surface of said cross bore in rolling contact therewith, recesses are formed in the outer surfaces of said inner shaft member on the opposite sides of and spaced in the axial direction of said inner and outer shafts from said bores in said inner shaft member, the surfaces of said recesses facing outwardly toward said outer shaft are planar, said recesses located in opposed facing relation to said grooves in said outer shaft, and plastic elements seated within said recesses and extending outwardly therefrom into sliding surface contact with said grooves for axially guiding said inner shaft member within said outer shaft member, the surface of said plastic elements in said grooves conforming to the surface of said grooves and the surface of said plastic elements within said recesses conforming to and disposed in surface contact with the planar surfaces in said recesses.

2. Telescopic drive shaft, as set forth in claim 1, wherein said roll bodies are at least partly spherical for a complete circumferentially extending band on the outer surface thereof and the diametrical dimension of the partly spherical portion of said roll bodies extending in the axial direction of said outer shaft member corresponds to the dimension of said cross bores extending in the axial direction of said outer shaft member.

3. Telescopic drive shafts, as set forth in claim 1, wherein said roll bodies are ball-shaped.

4. Telescopic drive shaft, as set forth in claim 1, wherein an annular spacer formed of a plastics material is seated within said cross bore in surface contact with the surface thereof, and said spacer being located between a pair of said roll bodies and disposed in surface contact with each of said roll bodies.

5. Telescopic drive shaft, as set forth in claim 1, wherein said outer shaft member having a generally circularly shaped outer surface with the outer surface opposite said grooves projecting outwardly from the remainder of said outer surface affording said outer shaft member with an oblong appearance in transverse cross section.

* * * * *

UNITED STATES PATENT OFFICE
CERTIFICATE OF CORRECTION

Patent No. 4,311,027  Dated January 19, 1982

Inventor(s) Werner Krude

It is certified that error appears in the above-identified patent and that said Letters Patent are hereby corrected as shown below:

In the heading of the patent [73] should read as follows:

[73] Assignee:
Uni-Cardan Aktiengesellschaft
Siegburg, West Germany

Signed and Sealed this

Fourth Day of May 1982

[SEAL]

Attest:

GERALD J. MOSSINGHOFF

Attesting Officer    Commissioner of Patents and Trademarks